United States Patent Office 2,729,676
Patented Jan. 3, 1956

2,729,676

PREPARATION OF β,β'-DISELENODIPROPIONIC ACID

Donald L. MacPeek, Charleston, W. Va., and William H. Rauscher, Brunswick, N. Y., assignors to the United States of America as represented by the Secretary of the Army No Drawing. Application April 29, 1953,
Serial No. 352,053

1 Claim. (Cl. 260—537)

This invention relates to fungicidal compounds and more particularly to new compositions of matter having pronounced fungicidal activity.

Electronic equipment in use may be exposed in many instances to a combination of severe climatic conditions such as extremes of heat, cold, and humidity. The presence of high humidity may have many deleterious effects upon the electrical insulation and consequently upon the surface characteristics of hook-up wire.

It is known that currents may flow through the volume of the insulation and over its surface in various ways. At high humidity, the current over the surface may be relatively large and may change markedly with change in humidity. In electronic applications, such currents may flow from the bare conductor at a terminal back along the surface of the wire insulation to some point where the wire insulation may touch ground, an uninsulated component or another wire. Also, in the latter case, the current may flow along the second wire to another terminal.

Mold growth is associated with high humidities and moisture and mold growth both increase the dissipation factor and capacitance measured along the surface of hook-up wire insulation. This increase is greatest at low frequencies and is apparently due to the polarization effects of moisture absorbed at the surface.

Inasmuch as the deleterious factors of mold and high humidity are intimately related, surface electrical properties of hook-up wire can be greatly improved by the development of fungicidal compositions which remain stable at high temperatures and which can be incorporated into hook-up wire so as to make it resistant to contamination by mold.

It is, therefore, a primary object of the present invention to provide new compositions of matter having pronounced fungicidal activity and stability at high temperature.

It is a further object of the present invention to provide esters of β,β'-diselenodipropionic acid having fungicidal properties.

It is another object to provide a method for preparing β,β'-diselenodipropionic acid.

In accordance with the present invention there are provided diesters of β,β'-diselenodipropionic acid having the general formula ROOC—CH$_2$—CH$_2$—Se—Se—CH$_2$—CH$_2$—COOR wherein R is an alkyl or an alkoxy alkyl radical.

Also, in accordance with the present invention, there is provided a method for preparing diselenodipropionic acid comprising reacting beta propionolactone with sodium selenide, acidifying the reaction product and allowing the acidified reaction product to form the diselenodipropionic acid in the presence of air.

For a better understanding of the present invention, together with other and further objects thereof, reference is had to the following description and its scope will be pointed out in the appended claim.

In order that those skilled in the art may better understand how the present invention may be carried into effect, the following methods are provided by way of illustration.

To prepare β,β'-diselenodipropionic acid, an alkali selenide such as sodium, potassium, or ammonium selenide and the like is slowly reacted with beta propionolactone in aqueous solution to form the addition product. The product is acidified with a suitable acid such as hydrochloric acid, etc. and the desired product is obtained by a suitable method such as extraction. The following examples are illustrative of preferred embodiments of the foregoing method.

EXAMPLE I

A quantity of 38 grams (0.25 mole) of sodium selenide is dissolved as completely as possible in 50 ml. of water contained in a 500 ml. 3 necked flask having standard taper joints. The flask is fitted with a dropping funnel and motor stirrer. The mixture is stirred for about 10 minutes to aid solution and then is placed in a 15° C. bath. This bath temperature is maintained throughout the run. A quantity of 18 grams (0.25 mole) of beta propionolactone is added dropwise over a period of 30 minutes with the evolution of much heat. After the completion of the addition, the mixture is then acidified by the dropwise addition of 50 ml. of concentrated hydrochloric acid. During the progress of the reaction, the color of the solution changes to a deep red color and considerable solid precipitates. The solution is allowed to stand for a while to permit the H$_2$Se formed in the reaction to escape. The reaction mixture is then placed in a continuous extractor and sufficient ether is added to permit the extractor to function. After 6 hours of extraction, the ether possesses a definite yellow color and upon evaporation of the ether, a dry yellow residue having a disagreeable odor remains.

EXAMPLE II

In this example, all quantities and conditions are kept the same as in Example I except for the temperature. The addition of the lactone is started at 22° C. and a constant temperature is not maintained. The temperature will rise to about 85–95° C. by the end of the addition and then fall back to room temperature.

EXAMPLE III

In this example all quantities and conditions are kept the same as in Example I other than that the temperature is maintained as near 0° C. as possible throughout the reaction.

It has been found from the above examples that the presence of small traces of atmospheric oxygen causes decomposition of the metastable sodium selenide solution to form plates of metallic selenium (gray form) upon the surface. They become heavy and sink leaving a fresh liquid surface exposed where more decomposition and loss can take place. To obviate this difficulty, it has been found that flushing the apparatus in which the reaction takes place with nitrogen and also flushing the distilled water from which the solution is made reduces the quantity of selenium which precipitates but does not completely eliminate the difficulty. Method of preparing β,β'-diselenodipropionic acid taking these factors into consideration are illustrated by the succeeding examples.

EXAMPLE IV

A 1 liter 3 necked flask with ground glass joints is fitted with a motor driven stirrer with a mercury seal, thermometer, and gas entrance and exit tubes. The gas exit tube is connected first to an empty 500 cc. suction flask which serves as a trap for any expelled reaction mixture. The gases are passed from this flask to a second suction flask which contains a dilute solution of sodium hydroxide or other suitable alkali to absorb any evolved hydrogen selenide. A manometer is attached to the trap flask to provide a visual means of observing the pressure inside the system and a dropping funnel is attached to an offset from the gas entrance tube. The apparatus is flushed with nitrogen for about 20 minutes at which point about 0.25 mole (38 grams) of sodium selenide is dropped in and covered with 250 ml. of distilled water which has been flushed with nitrogen. The selenide is allowed to dissolve for about 30 minutes and the flask is then cooled to 10° C. by suspension in an ice bath. This temperature is maintained as the upper limit for the rest of the reaction period. A weight of 19.5 grams of the beta propionolactone is added slowly through the dropping funnel at the rate of approximately 10 ml. per hour. The mixture is stirred for about 1 to 2 hours after the lactone is completely added. It is to be noted that with this procedure, no voluminous and amorphous precipitate forms at any time during the reaction. The mixture is then acidified by the dropwise addition of an excess of concentrated hydrochloric acid with no large volume of hydrogen selenide being given off and the precipitate which settles out in this reaction is light yellow, not the dark mass obtained by the procedures illustrated in Examples I, II, and III. Thus, the increased fluidity of the entire reaction mixture makes handling much easier and the extraction which follows is much more rapid with more complete removal of the organic products because the hindering quantity of selenium is absent.

The reaction mixture is heated in the flask to about 70° C. for about 1 hour to improve the physical properties of the precipitate and to convert some of the monomeric selenol-acid formed during the reaction to the dimeric diselenide. The reaction mixture is next transferred to a continuous extractor, ether is added, and the extraction is begun. After about 4 hours, a clear aqueous solution remains with a small quantity of granular black selenium at the bottom of the extractor. The ether extract is slowly evaporated to dryness yielding a golden yellow solid.

Sufficient concentrated hydrochloric acid is added to this solid to permit almost complete solution which is bright yellow in color. This solution is boiled vigorously for about 30 minutes and then filtered rapidly while hot on a Buchner funnel fitted with hardened filter paper. The filtrate is slowly cooled to about 10° C. in an ice bath and the light yellow solid precipitate which forms is filtered off. This precipitate is now dried by dessication and does not decompose upon this dessication. Repeated crystallizations with hot concentrated hydrochloric acid serve to produce a pure product.

EXAMPLE V

In this example, the apparatus is the same as that used in Examle IV except that the setup is modified to permit continuous ether extraction to be performed on the mixture as it remains in the reaction vessel making unnecessary any transfer operations. The temperature interval is varied between minus 5° C. to plus 5° C. and the rate of the addition of the lactone is 15 ml. per hour. The ether extraction is performed for about a 4 hour period as soon as the temperature of the mixture rises to room temperature after the addition of the lactone has been completed. In this example, the following reaction amounts are used and results obtained:

Weight of sodium solenide used_____ 113 grams (0.905 mole)
Weight of lactone used_____ 75 grams (1.0 mole)
Crude selenium acids obtained_ 94.1 grams (0.615 mole)
Byproduct selenium products_ 20.8 grams (0.264 mole)
Selenium from absorbed hydrogen selenide_____ 2.7 grams (0.029 mole)

The above example essentially accounts for nearly all the selenium.

EXAMPLE VI

A 3 necked 2 liter flask is fitted with a mercury sealed motor driven stirrer, a thermometer, gas inlet and outlet tubes and a dropping funnel. A flask fitted with a glass tube which extends below the level of the water in the flask serves as a means of visually observing the relative rate of the flow of nitrogen which is used to flush the apparatus both before and during the reaction. After a 20 minute period of flushing, 124.95 grams of sodium selenide is placed in the flask and immediately thereafter, 1 liter of distilled water is added through the dropping funnel. The mixture is stirred for 30 minutes to allow the sodium selenide to go into solution. During this entire period, the flask is suspended in a salt-ice bath, the stirring also aiding to bring the solution to reaction temperature of about 0° C. The data in the following table applies to the temperature control, nitrogen pressure and rate of addition of the beta propionolactone to the sodium selenide solution.

| Time—Hr., Min. | Bath Temp., °C. | Ml. of Lactone Added | Vessel Temp., °C. | Pressure Nitrogen, p. s. i. | Ml. Lactone Added per 15 Min. | Ml. Lactone Added per Min. |
|---|---|---|---|---|---|---|
| 0.00 | −6 | 0.00 | 26 | 2.6 | | |
| 0.05 | −3.8 | 0.00 | 18.2 | 1.2 | | |
| 0.10 | −2.1 | 0.00 | 14.2 | 1.2 | | |
| 0.15 | −1.9 | 0.00 | 8.0 | 1.2 | | |
| 0.20 | −2.4 | 0.00 | 6.1 | 1.2 | | |
| 0.25 | −3.0 | 0.00 | 3.8 | 1.2 | | |
| 0.30 | −3.2 | 0.00 | 1.2 | 1.2 | | |
| 0.45 | −4.2 | 10.00 | 2.8 | 1.2 | | |
| 1.00 | −4.0 | 15.00 | 2.8 | 1.2 | 10.00 | 0.667 |
| 1.15 | −3.8 | 20.00 | 3.0 | 1.2 | 5.00 | 0.333 |
| 1.30 | −3.2 | 28.00 | 2.8 | 1.2 | 5.00 | 0.333 |
| 1.45 | −3.1 | 41.00 | 3.2 | 1.2 | 8.00 | 0.543 |
| 2.00 | −1.8 | 48.00 | 3.3 | 1.2 | 13.00 | 0.866 |
| 2.15 | −0.6 | 56.00 | 3.3 | 1.2 | 7.00 | 0.466 |
| 2.30 | −0.2 | 63.40 | 3.2 | 1.2 | 8.00 | 0.543 |
| | | | | | 7.40 | 0.493 |

After the lactone has been added the mixture is allowed to stand for a period and the solution is then made acid to litmus with concentrated hydrochloric acid. One liter of ether is added in order to extract the organic product of the reaction. The extraction is effected by rapid stirring of the 2 phase system in the reaction flask, several additions of ether being necessary to remove the selenium product from the aqueous layer. The extracts are combined and concentrated to a point where the less soluble dibasic acid precipitates. The precipitate is removed by filtration and the remaining solution is poured into hot hydrochloric acid in order to effect complete oxidation to the dibasic acid. Considerable selenium precipitates in the oxidation process. The solution is filtered and upon cooling of the filtrate, the crude acid is precipitated and it is further treated to purify it.

EXAMPLE VII

In this example, a weight of 100 grams of sodium selenide is dissolved in 1 liter of boiled distilled water at 0° C. by stirring in the reaction vessel. A weight of 57.6 grams of beta propionolactone is added dropwise thereto over a period of 4 hours. After an additional 4 hours stirring period, the mixture is acidified with a slight excess of 1:1 sulfuric acid. An immediate extraction of ether is then performed and the ether extracts are combined and dried over sodium sulfate. The solution is allowed to stand about 1 day to permit some of the hydrogen selenide entrained in the ether to escape. The extract solution is then allowed to evaporate.

In the following table there is presented data on the physical characteristics of $\beta,\beta'$-diselenodipropionic acid. This acid shows marked fungicidal properties and when it is present in concentrations as low as $10^{-3}$ M per liter it will completely inhibit the growth of representative molds such as *Aspergillus niger*, Trichoderma T-1, and Curvularia spores.

Characterization of β,β'-diselenodipropionic acid

| Molecular Weight | Melting Point, °C | Color | Crystal Form | Solubility |
|---|---|---|---|---|
| 304.07 | 132.3–134.6 | Light Cream Yellow | Amorphous Powder | Hot Conc. Hydrochloric Acid, Acetone, Ether, Pyridine, Methanol, Ethanol, Ethyl acetate. |

In synthesizing esters of β,β'-diselenodipropionic acid, the procedure for their preparation comprises refluxing the acid with the appropriate alcohol in the presence of benzene, the benzene being to remove the water of esterification as an azeotrope. Sulfuric acid is employed as a catalyst and the apparatus for carrying out this preparation consists of a 3 necked flask provided with a dropping funnel and a thermometer located in the vapor phase. A Barrett receiver topped with a Friedrichs condenser and drying tube is attached to the third neck of the flask.

Concentrated sulfuric acid is dissolved in the alcohol and the solution is heated to a temperature sufficiently high to enable the β,β-diselenodipropionic acid to be dissolved therein. At this point, benzene is added slowly through the separatory funnel at such a rate as to maintain steady thermal and distillate conditions. Following the completion of the reaction which may be noted by observing cessation of the separation of the water from the azeotrope, the contents of the flask are washed free of sulfuric acid with water and aqueous sodium carbonate. The esters are distilled at low pressure. Details of the foregoing preparation are given in the following table. The esters listed are new compounds.

Esters of β,β'-diselenodipropionic acid

| Moles of β,β'-Diselenodipropionic Acid Used | Alcohol Name | Moles of Alcohol | H₂SO₄, Ml. |
|---|---|---|---|
| 0.00725 | Methyl | 0.86 | 0.8 |
| 0.0122 | Ethyl | 0.67 | 0.6 |
| 0.0115 | n-Propyl | 1.09 | 0.5 |
| 0.0112 | n-Butyl | 1.47 | 1.0 |
| 0.0131 | 2-Methoxyethyl | 0.634 | 0.8 |
| 0.0131 | 2-Ethoxyethyl | 0.511 | 0.8 |
| 0.0131 | 2-Butoxyethyl | 0.268 | 1.4 |

In the following table, there are listed some of the physical properties of these esters. They are all liquid and are soluble in methanol, ethanol, ether, and acetone.

| Ester | Molecular Weight | Boiling Point | Color |
|---|---|---|---|
| Dimethyl | 322.112 | 188–191° C. (Pressure=11 mm.) | Light Yellow |
| Diethyl | 360.164 | 190–195° C. (Pressure=9 mm.) | Light Yellow-orange |
| Dipropyl | 388.216 | 215–218° C. (Pressure=14 mm.) | Orange |
| Dibutyl | 416.268 | 212–215° C. (Pressure=9 mm.) | Orange-yellow |
| Di(Methoxyethyl) | 420.016 | 218–220° C. (Pressure=2.5 mm.) | Yellow-orange |
| Di(Ethoxyethyl) | 448.068 | 224–226° C. (Pressure=4 mm.) | Do. |
| Di(Butoxyethyl) | 504.172 | 200° C. (dec.) (Pressure=2.5 mm.) | Do. |

The aforementioned esters possess marked fungicidal properties and as such may be used to inhibit many types of fungal growth. In the following table, there are listed the concentration and consequent fungicidal activities of the esters upon a representative mold such as *Aspergillus niger*. Concentration of the esters are expressed in moles per liter.

Inhibition to Aspergillus niger

| Ester of β,β'-Diselenodipropionic Acid | Percent Inhibition at Concentration | | |
|---|---|---|---|
| | $10^{-3}$ M | $10^{-4}$ M | $10^{-5}$ M |
| Dimethyl | 100 | 100 | 100 |
| Diethyl | 100 | 100 | 100 |
| Dipropyl | 100 | 41.6 | 2.9 |
| Dibutyl | 67.3 | 26.5 | ---- |
| Di(Methoxyethyl) | 100 | 100 | 15.2 |
| Di(Ethoxyethyl) | 100 | 100 | 17.4 |
| Di(Butoxyethyl) | 100 | 46.4 | 9.6 |

The fungicidal properties of the esters are effectively utilized when they are incorporated into electrical insulating material. They may be incorporated into wire insulation and will serve as effective inhibitors of mold growth.

While there have been described what is at present considered to be the preferred embodiments of the invention, it will be obvious to those skilled in the art that various changes and modifications may be made therein without departing from the invention and it is, therefore, aimed in the appended claim to cover all such changes and modifications as fall within the true spirit and scope of the invention.

What is claimed is:

A method of preparing β,β'-diselenodipropionic acid comprising slowly reacting sodium selenide with beta propionolactone in aqueous solution at a temperature between 5° C. and —5° C. in an oxygen free atmosphere, and acidifying said reaction solution to form said diselenodipropionic acid.

References Cited in the file of this patent

UNITED STATES PATENTS

| | | |
|---|---|---|
| 2,449,987 | Gresham | Sept. 28, 1948 |
| 2,449,989 | Gresham | Sept. 28, 1948 |
| 2,449,992 | Gresham | Sept. 28, 1948 |
| 2,556,451 | Smith | June 12, 1951 |
| 2,577,719 | Steward | Dec. 4, 1951 |
| 2,691,000 | Elliott | Oct. 5, 1954 |

OTHER REFERENCES

Beilstein—4th ed. (1921). Band III, pages 215–301.